March 6, 1956 P. F. PETERSON 2,737,085
AIRCRAFT GUN MOUNT

Filed Aug. 18, 1952 3 Sheets-Sheet 1

*INVENTOR.*
PAUL F. PETERSON
BY
*William L. Lane*
ATTORNEY

March 6, 1956  P. F. PETERSON  2,737,085
AIRCRAFT GUN MOUNT

Filed Aug. 18, 1952  3 Sheets-Sheet 2

*INVENTOR.*
PAUL F. PETERSON
BY
*William R. Lane*

ATTORNEY

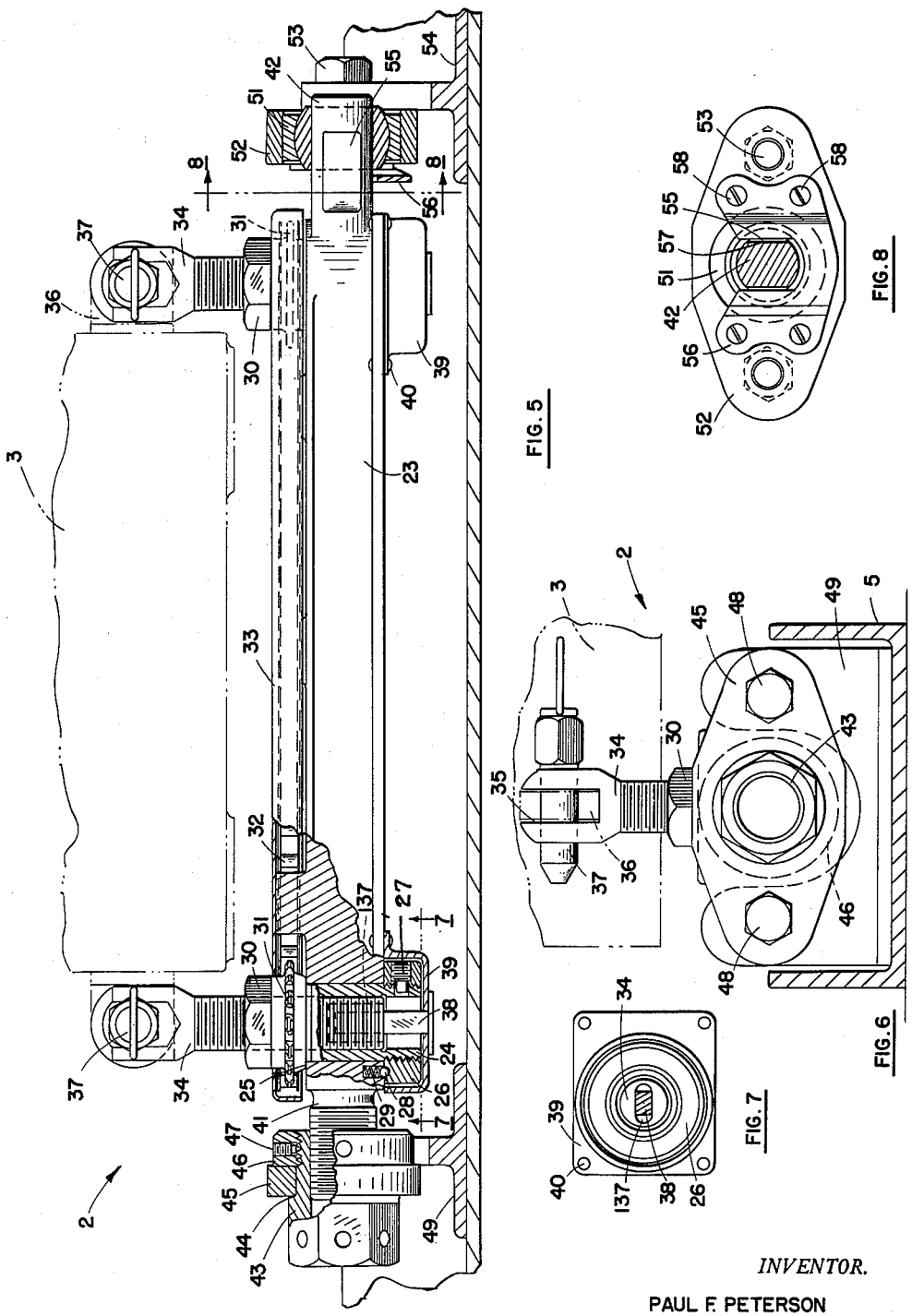

United States Patent Office 2,737,085
Patented Mar. 6, 1956

2,737,085

AIRCRAFT GUN MOUNT

Paul F. Peterson, Palos Verdes Estates, Calif., assignor to North American Aviation, Inc.

Application August 18, 1952, Serial No. 304,944

10 Claims. (Cl. 89—37.5)

This invention pertains to a gun mount and more particularly to an adjustable mount for supporting a gun in an aircraft.

A gun in an aircraft should be supported in a manner that will enable it to be adjusted and retained in adjustment for firing in the proper direction relative to the airplane. An aircraft gun mount, like all other components of the aircraft, should be as light in weight as possible. In addition the space available for a gun mount may be limited so that the mount should be as compact as possible. In addition, the gun mount must be of rugged construction to resist the various loads imposed in the firing of the gun. This includes not only loads longitudinally of the gun, but also torque loads which are produced as the gun fires.

An object of this invention is to provide a gun mount that is adjustable vertically and laterally.

Another object of this invention is to provide a gun mount that is lightweight, yet strong enough to resist loads thereon.

An additional object of this invention is to provide a gun mount that is simple and economical to manufacture.

A further object of this invention is to provide a gun mount providing a rigid support resistant to torque forces.

Yet another object of this invention is to provide a gun mount, portions of which can be detached only when the barrel of the gun is removed.

Still another object of this invention is to provide a gun mount enabling the gun to be pivoted away from the aircraft structure while prevented from excessive pivotal movement.

These and other objects will become apparent from the following detailed description taken in connection with the accompanying drawings in which.

Figure 4:
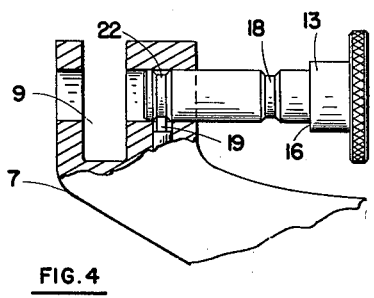

Fig. 4 is a fragmentary view, partly in section, of a pin in a fully retracted position, Fig. 5 is an elevational view, partly in section, of the rear mounting means, Fig. 6 is a side elevational view of the rear mounting means, Fig. 7 is a sectional view along line 7—7 of Fig. 5, Fig. 8 is a sectional view along line 8—8 of Fig. 5, and Fig. 9 is a top view illustrating the action of the stop means.

Figure 1:
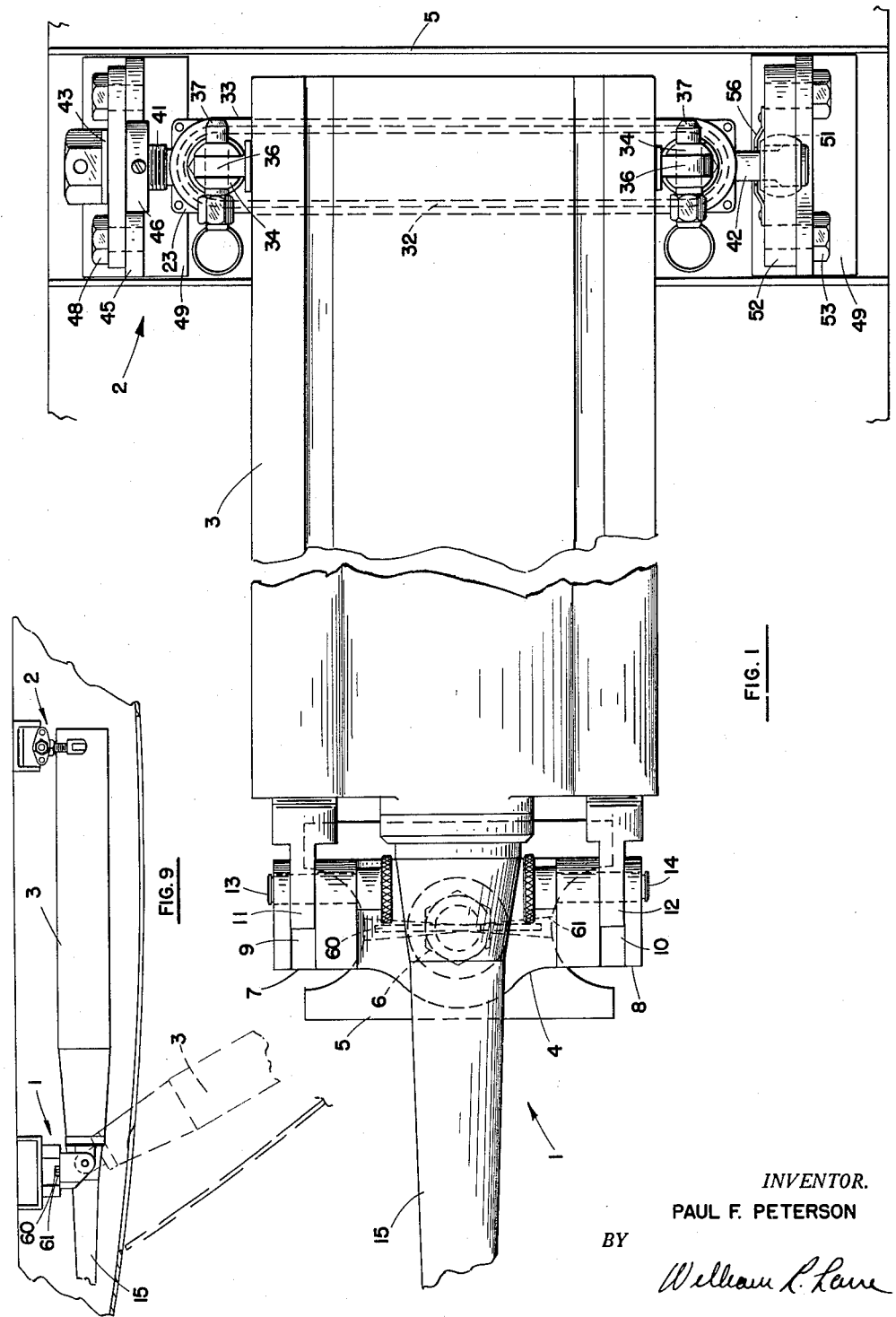
Fig. 1 is a plan view of the front and rear mounts supporting a gun.

As shown in Fig. 1, the gun mount of this invention includes a front mounting means 1 and a rear mounting means 2 adapted to hold gun 3 between them. The mounts are shown for convenience of illustration arranged to hold a gun in a normal horizontal position. However, if desired, this gun mount could be used equally well to hold the gun on its side, upside down or at various angles.

Figure 2:
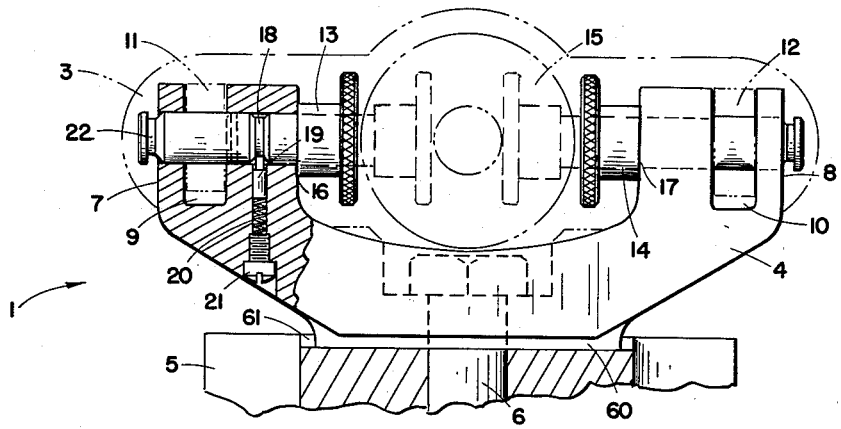
Fig. 2 is an elevation, partly in section, of the front mounting means.
Figure 3:
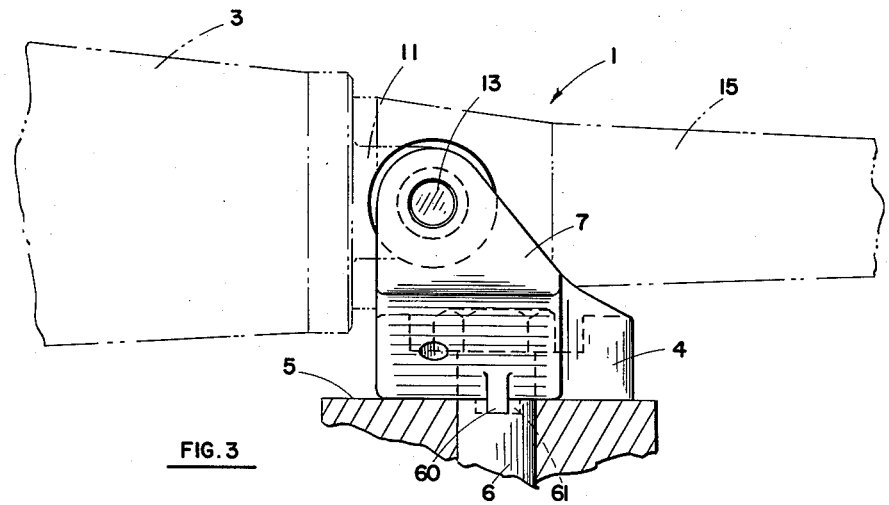
Fig. 3 is a side elevational view of the front mounting means.

As best seen in Figs. 1, 2 and 3, the front mounting means includes a bifurcated, substantially U-shaped member 4 which is pivotally secured to portions of the aircraft structure 5 by a suitable means such as screw or post 6 which extends through member 4 to the aircraft structure. Member 4 includes legs 7 and 8 in which are provided apertures 9 and 10 for receiving tab portions 11 and 12 of the gun. Tab portions 11 and 12 of the gun and legs 7 and 8 of member 4 have openings therethrough into which may be inserted retaining pins 13 and 14. The gun is thus held in member 4 free for vertical pivotal movement by means of the retaining pins, while member 4 is in turn connected to the aircraft by means of screw 6, free for horizontal pivotal movement. It should be observed that barrel 15 of the gun fits between legs 7 and 8 of member 4 and prevents disengagement of retaining pins 13 and 14. These pins can be removed (to the position shown in phantom in Fig. 2) for freeing the gun from the mounts only when barrel 15 of the gun has been removed from the body of the gun.

As best illustrated in Fig. 2, pins 13 and 14 are provided with shoulders 16 and 17 which engage the inner portions of legs 7 and 8 when the pins are in a gun retaining position. Each pin is also provided with a groove 18 which is engaged by detent member 19 for keeping the pins in a gun retaining position. Each of legs 7 and 8 has an aperture therein for receiving a detent 19, and a spring 20, held in place by screw 21, loads the detent. Detent 19 provides a retaining force which may be forcibly overcome when it is desired to disengage the gun from the mount. In Fig. 4 pin 13 is shown in a fully retracted position following removal of gun barrel 15. In that position, detent 19 will engage a second groove 22 in the pin for preventing further inward movement of the pin, thus guarding against inadvertent loss of the pin from the gun mount. Of course the same provision is made for pin 14.

The rear mounting means is best illustrated in Figs. 1, 5 and 6. This portion of the mount includes an elongated base member 23 which is provided with apertures to receive two bushing members 24 which are rotatable therein. Each bushing has a shoulder 25 for engaging the top of base member 23. In addition a nut 26 is threadably received on the lower portion of the bushing and adapted to engage the bottom of base member 23. Nut 26 is prevented from rotation relative to bushing 24 by means of lock screw 27. Thus the bushing is retained in the base member by means of shoulder 25 and nut 26. The surface of nut 26 which engages base member 23 is provided with recessed portions which may be engaged by balls 28 which are loaded by springs 29. The ball and spring units tend to retain the bushing members in a stationary position preventing inadvertent rotation and change in setting of the bushing members.

The upper portion of each bushing 24 includes a hexagonal portion 30 below which is a sprocket 31. Chain 32 engages the sprocket of each bushing interconnecting the two so that rotation of one causes equal and like rotation of the other. Hexagonal portions 30 allow convenient rotation of the bushing members. Base member 23 may be provided with a cover 33 which protects chain 32 and the moving parts.

Each of bushings 24 is provided with a threaded interior bore which receives a threaded gun supporting member 34. The upper portion of each gun supporting member includes a slot 35 which is adapted to receive a projecting tab 36 of the gun. The slotted portion of each of the gun supporting members and tabs 36 of the gun are provided with apertures through which retaining pins 37 may be inserted. These retaining pins thus retain gun tab portions 36 within the slotted portion of the gun supporting members. As shown in Fig. 6, slots 35 are made slightly wider than tabs 36. This allows for pivotal movement of the gun when the rear mount is adjusted laterally in the manner more fully explained hereinafter.

It can be seen thus far that by rotation of one of bushings 24 equal and like rotation of both bushings is effected. This rotation will cause gun supporting members 34, which are prevented from rotation by their engagement with the tabs of the gun, to move in a vertical direction depending upon the direction of rotation of bushings 24. In this manner there is provided means for vertically adjusting the rear portion of the gun. When this takes place the front portion of the gun pivots vertically about retaining pins 13 and 14.

The bottom of each gun supporting member 34 is provided with a straight-sided aperture 137 (see Fig. 7). Into this aperture projects square or rectangular pin 38 which is held in a stationary position by means of bracket 39, attached to base member 23 in any suitable manner, such as by rivets 40. The straight-sided opening in the gun supporting member together with stationary square or rectangular pin 38 will prevent rotation of the gun supporting member at times when the gun is removed from the mount, thus assuring that the vertical setting of the gun mount will be maintained.

Base member 23 is supported in the aircraft by means of end portions 41 and 42. End portion 41, the left end as shown in Fig. 5, is threaded. This end of the base member is received by sleeve 43 which has a threaded interior bore. Sleeve 43 is provided with a shoulder 44 adapted to engage stationary bracket 45. The opposite side of bracket 45 is engaged by nut 46 which threadably engages the exterior of sleeve 43 and is prevented from rotation relative thereto by screws 47. Sleeve 43 is thus rotatably mounted in bracket 45 and held against disengagement therefrom by shoulder 44 and member 46. Stationary bracket 45 is held by means of screws 48 to member 49, welded or otherwise suitably attached to the aircraft structure 5. Bracket 45 is thus rigidly held and in effect becomes a portion of the aircraft structure. The exact arrangement of the fixed portions of the aircraft structure could be changed, of course, without affecting the basic operation of sleeve 43.

Opposite end 42 of base member 23 is rounded and slidably received in bearing 51. This bearing is of the hemispherical type to accommodate any misalignment between bearing 51 and the sleeve 43. Bearing 51 is received in a stationary bracket 52, held by screws 53 to a member 54, welded or otherwise suitably attached to the aircraft structure in a similar manner to the attachment of bracket 45 to the aircraft structure.

It can be seen from the above description that lateral adjustment of base member 23, and thus of the rear portion of the gun, may be obtained by rotating sleeve 43 which advances threaded end 41 within the bore of the sleeve while end 42 slides within bearing 51. As lateral adjustment of the rear mount takes place the front mount will pivot about screw 6.

End 42 of the base member is provided with flattened portions 55 on the sides thereof. A retainer 56 extends over end 42 and receives flattened portions 55 within a substantially complementary but larger opening 57 (see Fig. 8). The retainer is held to bracket 52 by suitable means such as screws 58. When the gun is in position and engaged by the rear mount, rotation of the mount is prevented by the gun itself. When the gun is removed from the rear mount rotation of the base member, and thus of the mount, is prevented only by retainer 56 which will engage flat portions 55 to prevent excessive rotation of the base member. The retainer, of course, has a larger opening than that of the space between the flattened portions of end 42 so that a certain amount of rotation will be permitted as when the gun mount is adjusted.

A feature of the gun mount which is particularly valuable in cases of a side or angle mounting arrangement is the stop means for the front mount shown in Figs. 1, 2, 3 and 9. The stop comprises a key 60 which projects from the bottom of U-shaped member 4 of the front mount. This key mates with key-way 61 of the aircraft structure, or a bracket fixed thereto, to which the front mount is pivotally secured by means of screw 6. Key 60 cooperates with key-way 61 to limit the pivotal movement of the front mount. This stop finds its greatest use when the gun is mounted on its side as illustrated in Fig. 9. After the barrel of the gun has been removed and the rear portion of the gun loosened from the rear mount it is possible to pivot the gun outwardly away from the aircraft structure about pins 13 and 14. The key and key-way will prevent the rear portion of the gun from dropping downwardly as it is pivoted outwardly, thus avoiding damage to the aircraft structure or other components of the aircraft mounted below the gun. When swung outwardly to the position indicated in phantom in Fig. 9 the gun is readily accessible for inspection or servicing.

It should be observed that the rear mount is of the two-post type having two gun supporting members 34. This provides a particularly rigid type of rear gun support resistant to the high torque loads which are present in the rear portions of a gun. The two gun mounts of this invention enable the gun to be moved in two directions so that its adjustment may be accurately obtained and it will firmly hold the gun in a desired position. The mount is simple in construction, light in weight and compact in design.

The foregoing detailed description is to be clearly understood as by way of illustration only and is not intended by way of limitation, the spirit and scope of this invention being limited only by the appended claims.

I claim:

1. Means for mounting a gun in an aircraft comprising front supporting means, said means including a substantially U-shaped member pivotally secured to said aircraft and adapted to receive the barrel of said gun between the legs thereof, pin means in the legs of said U-shaped member, each pin means being movable outwardly from the axis of said U-shaped member to a position of pivotal engagement with portions of said gun spaced from the barrel thereof whereby when each of said pin means is in such position the inner end thereof is adjacent to said barrel and said pin means are removable from said engagement only when said barrel is removed from said gun, said pin means thereby pivotally securing said gun to said U-shaped member, whereby the front portion of said gun is mounted in said aircraft for pivotal movement relative thereto; and rear supporting means cooperating with said front supporting means to effect said pivotal movement, said means including a base member laterally adjustable, means for attaching said base member to said aircraft, oppositely disposed gun supporting means engaging said base member and adapted to engage portions of said gun, and rotatable means interconnecting said gun supporting means and operable for effecting simultaneous vertical adjustment of said gun supporting means relative to said base member.

2. A device as recited in claim 1 in which said aircraft structure is provided with a recessed portion therein, and further including stop means associated with said U-shaped member for cooperating with said recessed portion thereby to limit the pivotal movement of said U-shaped member relative to said aircraft structure.

3. Means for mounting a gun in an aircraft comprising front supporting means, said means including a bifurcated member pivotally mounted in said aircraft, and means for securing said gun to said bufurcated member for pivotal movement relative thereto, whereby the front portion of said gun is mounted in said aircraft for pivotal movement relative thereto; and rear supporting means, said means including an elongated base member, laterally spaced bushing members rotatably engaging said base member, a gun supporting member threadably received in each of said bushing members for engaging opposite sides of said gun, means interconnecting said bushing members whereby said members rotate equally and simultaneously for effecting vertical adjustment of said gun, and threaded means engaging said base member and said aircraft for effecting lateral adjustment of said base member relative thereto, whereby said rear supporting means cooperates with said front supporting means to effect said pivotal movement of said gun.

4. Means for mounting a gun in an aircraft comprising front supporting means for mounting the front portion of said gun in said aircraft for pivotal movement relative thereto, said means including a substantially U-shaped member, means for pivotally securing said gun to said member, a post member pivotally interconnecting said U-shaped member and said aircraft, and stop means associated with said U-shaped member for cooperating with portions of said aircraft thereby to limit the pivotal movement of said U-shaped member; and rear mounting means cooperating with said front mounting means to effect said pivotal movement of said gun, said means including an elongated base member, rotatable means for supporting said base member in said aircraft, said means having a threaded connection with said base member whereby said means is operable to effect horizontal adjustment of said base member, and a pair of vertical gun supporting members adjustably carried by said base member and adapted to engage the rear portion of said gun whereby said members are operable to effect vertical adjustment of said gun relative to said base member.

5. Means for mounting a gun in an aircraft comprising front mounting means, said means including a substantially U-shaped member for receiving said gun, horizontally disposed pin means associated with the end portions of said U-shaped member for pivotally attaching said gun to said member whereby said gun is free for vertical pivotal movement relative thereto, and means for securing said U-shaped member to said aircraft for horizontal pivotal movement, whereby the front portion of said gun is mounted in said aircraft for pivotal movement relative thereto; and rear mounting means cooperating with said front mounting means to effect said pivotal movement, said means including an elongated base member, a pair of gun supporting members vertically adjustably carried thereby for engaging the rear portion of said gun whereby adjustment of said supporting members effects vertical pivotal movement of said gun, and means associated with fixed portions of said aircraft for supporting said base member, said means adjustably engaging said base member and operable for effecting horizontal pivotal movement of said gun.

6. A gun mount comprising a base member, said member having a duality of apertures therein; a bushing member in each of said apertures rotatable relative to said base member each of said bushings having a vertically disposed threaded bore, a gun supporting member threadably engaged by each of said bushings in said bore whereby rotation of said bushings effects vertical adjustment of said gun supporting members relative to said base member; and oppositely disposed members engaging said base member and fixed portions of said aircraft, at least one of said members providing a horizontal threaded connection with said base member and operable for effecting lateral adjustment of said base member.

7. Gun supporting means for an aircraft comprising a base member, said member being provided with a horizontally disposed threaded portion; rotatable means engaging fixed portions of said aircraft and adapted to engage said threaded portion whereby rotation of said rotatable means effects lateral adjustment of said base member; a duality of gun supporting members; means threadably receiving and holding said gun supporting members in a vertical direction and rotatably engaging said base member; and means interconnecting said last mentioned means for effecting simultaneous movement thereof for providing vertical adjustment for said gun supporting members relative to said base member.

8. An aircraft gun mount comprising an elongated base member; oppositely disposed sleeve and bearing means engaging portions of said aircraft, said sleeve means having an aperture threadably engaging said base member and said bearing means having an aperture slidably engaging said base member, whereby rotation of said sleeve means effects horizontal adjustment of said base member relative to said aircraft; and threaded gun supporting means carried by said base member, said base member including rotatable bushing means having vertically disposed threaded bores for receiving said gun supporting means whereby said gun supporting means are operable for effecting vertical adjustment of said gun.

9. A gun mount for an aircraft comprising a base member, said member having a pair of openings therein; a bushing member rotatably received in each of said openings, each of said bushings having a vertically disposed threaded interior bore; a gun supporting member received in the bore of each of said bushings whereby rotation of said bushings vertically adjusts said gun supporting members relative to said base member; flexible means interconnecting said bushings whereby said bushings are simultaneously rotatable; and means for carrying said base member in said aircraft, said means including at least one horizontal member threadably engaging portions of said base member for effecting lateral adjustment thereof.

10. Means for mounting a gun in an aircraft comprising an elongated base member, said member being provided with two spaced apertures therein; a vertical bushing member received in each of said apertures; chain means operably interconnecting said vertical bushing members whereby said members are simultaneously rotatable in said apertures; a gun supporting member threadably engaging each of said bushings; pin means securing said gun supporting members to said gun; said base member being further provided with a threaded end portion; horizontal bushing means rotatably engaging fixed portions of said aircraft and receiving said threaded end portion therein; and means engaging fixed portions of said aircraft for slidably receiving the opposite end portion of said base member whereby rotation of said horizontal bushing means effects horizontal adjustment of said base member.

References Cited in the file of this patent

UNITED STATES PATENTS

| | | |
|---|---|---|
| 2,076,256 | Swalm et al. | Apr. 6, 1937 |
| 2,350,122 | Martin | May 30, 1944 |
| 2,383,985 | Ogg | Sept. 4, 1945 |
| 2,537,419 | Peterson | Jan. 9, 1951 |
| 2,612,819 | Johnson | Oct. 7, 1952 |